2,977,187

PURIFICATION OF THIOCYANATE SOLUTIONS

Victor C. Serreze, Jr., Cos Cob, and Witold R. Kocay, Stamford, Conn., assignors to American Cyanamid Company, New York, N.Y., a corporation of Maine No Drawing. Filed Oct. 14, 1957, Ser. No. 689,785

3 Claims. (Cl. 23—75)

This invention relates broadly to a chemical treatment of fluids and, more particularly, to the purification of thiocyanate solutions, especially such solutions which are to be used or re-used as the solvent component of a spinning solution, e.g., one comprised of a polymer of acrylonitrile.

In the production of staple fibers, continuous filaments (mono- and multifilaments), rods, tubes, films, ribbons, sheets and other shaped articles from a solution of a polymer of acrylonitrile dissolved in a concentrated aqueous solution of sodium thiocyanate or other water-soluble thiocyanate (with or without one or more other additives such as a lower monohydric alcohol), dilute solutions of the thiocyanate are obtained. (Such processes are described in, for example, Creswell U.S. Patents 2,558,730, –1, –2, –4 and –5, all dated July 3, 1951; Creswell and Wizon U.S. Patent No. 2,558,733 and Pollard U.S. Patent No. 2,558,781, each dated July 3, 1951; and British Patents 714,530, 715,915, 729,472 and 732,135.) It is important to the economics of the process that such dilute solutions be concentrated and the concentrated thiocyanate solution then reused in the process. Otherwise the manufacturing costs may be prohibitive from a competitive standpoint.

In making polyacrylonitrile fibers from solutions of the kind described in the preceding paragraph, and specifically from a polymer of acrylonitrile dissolved in a concentrated aqueous solution of sodium thiocyanate, it was discovered that, after spinning for varying periods of time, the spinnerette openings became obstructed, causing unsatisfactory spinning operations and the production of fiber of inferior quality, and eventually the shut-down of the spinning device for replacement of the spinnerette with one having unobstructed openings. The contaminated spinnerette then had to be cleaned. This was costly and time-consuming. Analytical studies revealed that the material that was obstructing the spinnerette holes comprised mainly sodium sulfate, which also was found to be present in the spinning solution or "dope" and, also, in the thiocyanate solution in which the acrylonitrile polymer was dissolved to make the dope. (The sodium sulfate may result, for example, from sulfoxy compounds used as the reducing agent of a redox catalyst system employed in the polymerization operation.) Other impurities found in recovered sodium thiocyanate solution include $CO_3^=$, $Cl^-$, $CN^-$, $NO_3^-$, $Fe^{+3}$, $Al^{+3}$ and $Cu^{+2}$.

The presence of sodium sulfate in the dilute (e.g., 2 to 20% by weight) sodium thiocyanate solution is also objectionable when concentrating the solution for re-use in the process, since it causes scale build-up in evaporators during evaporation of the solution.

It is a primary object of the present invention to provide a simple and inexpensive method of removing impurities comprising mainly sodium sulfate, as well as other impurities such as those mentioned above, from an aqueous solution of sodium thiocyanate containing the same, thereby obviating the difficulties set forth above.

Other objects of the invention will be apparent to those skilled in the art from the following more detailed description and the illustrative examples.

The objects of the invention are attained by admixing with an aqueous solution of sodium thiocyanate containing sodium sulfate and other impurities an amount of a water-soluble barium compound which is not more than the chemical equivalent amount required for converting all of the said sulfate to barium sulfate. Thereafter the precipitate (precipitated material) comprising barium sulfate is separated from the resulting thiocyanate solution, e.g., by filtration, centrifuging, decanting, etc.

To the best of our knowledge and belief, any water-soluble barium compound can be used. Illustrative examples of such compounds are barium hydroxide [$Ba(OH)_2 \cdot 8H_2O$], barium nitrate, barium acetate, barium thiocyanate, barium benzoate, barium nitrite, barium butyrate, barium chlorate, barium formate, barium chloride, etc. It is not necessary that the chosen water-soluble barium compound be one that has been preformed before addition to the aqueous thiocyanate solution. Instead one can use reagents that will react with each other to form a water-soluble barium compound in situ. Examples of such reagents are barium hydroxide and ammonium thiocyanate which can be added to the aqueous thiocyanate solution and will react with each other to form barium thiocyanate in situ.

The method of this invention is especially applicable in the treatment of dilute solutions of sodium thiocyanate, that is, solutions, containing from about 2% to about 20% by weight of NaSCN, and which also contain sodium sulfate as an impurity. However, aqueous sodium thiocyanate solutions containing about 20% by weight of NaSCN up to and including saturated aqueous solutions of sodium thiocyanate containing $Na_2SO_4$ as an impurity also can be effectively treated in accordance with this invention.

It is important that one determine, as by known chemical or other analytical techniques, the amount of sodium sulfate which is present in the sodium thiocyanate solution prior to adding the water-soluble barium compound thereto. As stated above, the amount of the latter should be not more than the chemical equivalent amount required for converting all of the sodium sulfate to barium sulfate. This is necessary so that there will not be an objectionable excess of barium salt in the treated solution. One part per million of barium (in the form of a compound or complex) has been found to be unobjectionable in a polyacrylonitrile spinning solution. Larger amounts, e.g., 10 to 100 parts per million or more, of barium are objectionable since, for one reason, it has been found that such quantities cause flocculation of the spinning solution.

The treating temperature is not critical and may range, for example, from ambient temperatures (e.g., 20°–30° C.) up to the boiling temperature of the thiocyanate solution at atmospheric pressure.

At any stage of the treatment of the sodium thio-cyanate solution with the water-soluble barium compound, or at the end of the treating period, there may be added thereto a finely divided adsorbent, more particularly a decolorizing agent, e.g., finely divided activated carbon, bone black, certain natural or activated bleaching clays, etc., and/or a filter aid, e.g., finely divided diatomaeceous earth. The adsorbent, e.g., a decolorizing agent, improves the color of the thio-cyanate solution and adsorbs other impurities such, for example, as hydroxides of iron and copper that may be present. Removal of such impurities decreases color formation in aqueous sodium thiocyanate solutions as well as in the final polyacrylonitrile fiber made from the spinning solution.

The amount of adsorbent and/or filter aid employed is not critical and may be varied as desired or as conditions may require, e.g., from 0.05% to 1 or 2% by weight of the thiocyanate solution.

In order that those skilled in the art may better understand how the present invention can be carried into effect the following examples are given by way of illustration and not by way of limitation. All parts and percentages are by weight unless otherwise stated. In all examples the content of sodium sulfate in the thiocyanate solution was determined prior to the addition of the pre-determined amount of water-soluble barium compound thereto.

*Example 1*

Two (2) kg. of 49% sodium thiocyanate containing 0.235% sodium sulfate (.033 mole) or 0.485 lb. sodium sulfate per 100 lbs. sodium thiocyanate is treated with 9.5 g. of barium hydroxide, $Ba(OH)_2 \cdot 8H_2O$ (0.030 mole), at 25° C. The mixture is stirred for 1 hour and then a small quantity (about 4 g.) of a mixture of finely divided decolorizing carbon and diatomaceous earth in a 2:1 weight ratio is added primarily as a filter aid but also to improve the color of the thiocyanate solution and to adsorb any hydroxides of iron and copper that may be present. Stirring is continued for 15 minutes longer and the mixture is suction-filtered through filter paper.

The filtrate contains 0.046% sodium sulfate (0.00032 mole) or 0.092 lb. sodium sulfate per 100 lbs. sodium thiocyanate. This corresponds to a sulfate removal of 80.5% or an efficiency of 89.5%. Residual barium in the treated sodium thiocyanate is 0.3 p.p.m.

*Example 2*

500 g. of 50% sodium thiocyanate solution containing 0.24% sodium sulfate by weight (0.0085 mole) is treated with 2.5 g. barium thiocyanate, $Ba(SCN)_2 \cdot 2H_2O$ (0.0085 mole), at 25° C. The mixture is stirred for ½ hour at this temperature. A small quantity (about 1 g.) of a mixture of finely divided decolorizing carbon and diatomaceous earth is then added, and the resulting mass is stirred for 10 minutes longer. The mixture is suction-filtered through filter paper. The filtrate contains 0.0078% sodium sulfate (0.000055 mole) in the same sodium thiocyanate concentration as above. Efficiency of sulfate removal is 96%. Residual barium in the sodium thiocyanate solution is 1 p.p.m.

*Example 3*

500 g. of sodium thiocyanate solution containing 0.24% sodium sulfate (0.0085 mole) or 0.48 lb. sodium sulfate per 100 lbs. sodium thiocyanate is treated with 2.5 g. barium hydroxide, $Ba(OH)_2 \cdot 8H_2O$ (0.0085 mole), and 1.21 g. ammonium thiocyanate (0.0170 mole) at 25° C. The pH of the mixture is now 8.6, which is due to the evolution of ammonia from the ammonium thiocyanate and barium hydroxide reaction. This pH is sufficient to remove dissolved iron as the insoluble hydroxide. Decolorizing carbon-diatomaceous earth addition and filtration are carried out as in Example 2. The filtrate is evaporated to 57% concentration at 100 mm. pressure. Analysis of the 57% sodium thiocyanate indicates that there remains 0.0045% sodium sulfate or 0.008 lb. sodium sulfate per 100 lbs. sodium thiocyanate. Thus a 98.4% removal of sodium sulfate has been achieved. Residual barium amounts to 0.3 p.p.m.

*Example 4*

Six hundred (600) gallons of a 9.15% sodium thiocyanate solution containing 0.11% sodium sulfate (1.21 lbs. sodium sulfate per 100 lbs. sodium thiocyanate) is treated with a chemical equivalent amount of barium hydroxide, and also with about 12 lbs. of a 2:1 by weight mixture of finely divided decolorizing carbon and diatomaceous earth. The mixture is stirred for 1 hour and filtered through a commercial plate filter press. The filtrate, upon being analyzed, is found to contain 0.00086% sodium sulfate or 0.0095 lb. sodium sulfate per 100 lbs. sodium thiocyanate. This corresponds to a removal of 99% of the sodium sulfate.

*Example 5*

A 57.5% sodium thiocyanate solution containing 0.16% sodium sulfate, 0.072% sodium chloride, and 100 p.p.m. copper is treated with a chemical equivalent amount of barium nitrate. A small amount (about 0.2% by weight of the thiocyanate solution) of a mixture of about 2 parts by weight of finely divided activated bleaching clay and 1 part of diatomaceous earth is added, and the mixture is heated for ½ hour at 75° C. and then filtered. The filtrate contains 0.0017% sodium sulfate, which corresponds to a 99% sulfate removal. Residual sodium chloride content is 0.041% and copper is reduced to 10 p.p.m.

*Example 6*

A 57.5% sodium thiocyanate solution containing 0.1% sodium sulfate is treated with a chemical equivalent amount of barium acetate. A small amount (0.2% by weight of the thiocyanate solution) of a 2:1 by weight mixture of finely divided decolorizing carbon and diatomaceous earth is added, and the mixture is stirred for 10 minutes at room temperature (about 20°–30° C.). After filtration, the filtrate gives a negative test for sulfate by addition of excess barium acetate.

*Example 7*

A 57.5% sodium thiocyanate solution containing 0.16% sodium sulfate is treated with a chemical equivalent amount of barium acetate and further processed as in Example 6. The filtrate gives a negative test for sulfate with excess barium acetate. Residual aluminum and iron contents are 1/30 of the original values.

We claim:

1. A method of purifying an impure, 2% to 20% by weight, aqueous sodium thiocyanate solution, which is formed in synthetic fiber spinning and contains a small amount of sodium sulfate as an impurity, to a degree of purity such that after concentration it can be used as the solvent component of a spinning solution that will not obstruct spinnerette openings by depositing impurities therein, said method consisting in determining the amount of sodium sulfate in the said thiocyanate solution, admixing with the aforesaid thiocyanate solution of known sodium sulfate content an amount of a water-soluble barium compound which is the chemical equivalent amount required for converting all of the said sulfate to barium sulfate, and separating the precipitate comprising barium sulfate from the resulting thiocyanate solution thereby to obtain a thiocyanate solution which upon concentration to form a solvent for a spinning solution contains an amount of barium, in combined form, that is insufficient to cause flocculation of the said spinning solution.

2. A method as in claim 1 wherein the water-soluble barium compound is barium hydroxide.

3. A method as in claim 1 wherein the water-soluble barium compound is barium thiocyanate.

References Cited in the file of this patent

UNITED STATES PATENTS

| | | |
|---|---|---|
| 1,920,557 | Hene | Aug. 1, 1933 |
| 2,424,983 | Hill | Aug. 5, 1947 |
| 2,575,238 | Stenger | Nov. 13, 1951 |
| 2,871,093 | Blanchard | Jan. 27, 1959 |

OTHER REFERENCES

Mellor: "A Comprehensive Treatise on Inorganic and Theoretical Chemistry," volume 3, page 765, Longmans, Green & Co., 1923.

UNITED STATES PATENT OFFICE
CERTIFICATION OF CORRECTION

Patent No. 2,977,187                        March 28, 1961

Victor C. Serreze, Jr., et al.

It is hereby certified that error appears in the above numbered patent requiring correction and that the said Letters Patent should read as corrected below.

Column 1, lines 29 and 31, for "Creswell", each occurrence, read -- Cresswell --; column 2, line 33, for "about" read -- above --; column 3, line 5, for "follownig" read -- following --.

Signed and sealed this 15th day of August 1961.

(SEAL)
Attest:
ERNEST W. SWIDER                                DAVID L. LADD

Attesting Officer                                   Commissioner of Patents